United States Patent [19]

Dorski

[11] Patent Number: 4,832,573

[45] Date of Patent: May 23, 1989

[54] INTEGRAL CONNECTION FOR PLASTIC WATER PUMP IMPELLER

[75] Inventor: Ronald L. Dorski, Marblehead, Ohio

[73] Assignee: General Motors Corporation, Detroit, Mich.

[21] Appl. No.: 125,949

[22] Filed: Nov. 27, 1987

[51] Int. Cl.$^4$ ............................................. F01D 5/30
[52] U.S. Cl. ........................... 416/241 A; 416/229 R; 416/244 R; 415/217.1; 415/216.1; 403/375; 403/383
[58] Field of Search ........... 416/204 R, 244 R, 241 A, 416/229; 415/214, 215; 403/383, 375, 341, 345, 335

[56] References Cited

U.S. PATENT DOCUMENTS

| | | | |
|---|---|---|---|
| 2,652,191 | 9/1953 | Buchi | 415/214 |
| 2,836,877 | 6/1958 | Hannahan | 415/214 |
| 3,145,912 | 8/1964 | Weis | 416/241 A |
| 3,303,791 | 2/1967 | Doble | 416/241 A |
| 3,319,939 | 5/1967 | Rogenski | 416/204 |
| 3,360,051 | 12/1967 | Trouilhet | 416/241 A |
| 3,819,294 | 6/1974 | Honnold et al. | 416/241 A |
| 3,872,691 | 3/1975 | Hildebrandt | 416/241 A |
| 4,157,225 | 6/1979 | Levine | 416/244 R |
| 4,557,672 | 12/1985 | Levine | 416/244 R |

FOREIGN PATENT DOCUMENTS

| | | | |
|---|---|---|---|
| 84134 | 8/1957 | Denmark | 416/244 B |
| 3223284 | 12/1983 | Fed. Rep. of Germany | 416/204 R |
| 463583 | 5/1975 | U.S.S.R. | 416/244 B |
| 713766 | 2/1980 | U.S.S.R. | 416/244 B |
| 15377 | of 1903 | United Kingdom | 403/341 |

OTHER PUBLICATIONS

European Pat. #64,767, Nov. 1982, Murohushi et al.

Primary Examiner—Robert E. Garrett
Assistant Examiner—John T. Kwon
Attorney, Agent, or Firm—Patrick M. Griffin

[57] ABSTRACT

An integral connection for a plastic water pump impeller includes a molded non circular plug and inwardly facing, radially flexible cylindrical wall in the center of the impeller, and a matching female socket and matching outwardly facing cylindrical wall on the end of the shaft. A rib on the impeller wall and groove in the shaft wall pop fit together and flex the impeller wall out as the impeller and shaft are push fitted together. The socket and plug prevent relative turning, and the rib and groove prevent the impeller from pulling off of the shaft.

1 Claim, 1 Drawing Sheet

INTEGRAL CONNECTION FOR PLASTIC WATER PUMP IMPELLER

BACKGROUND OF THE INVENTION

Vehicle water pumps include a shaft driven impeller, which is often formed of stamped steel and friction fitted to the end of a steel drive shaft. Impellers have also been molded of plastic, which has the obvious advantages of non corrosion and light weight, but it is not practical to also form the impeller drive shaft of plastic. Consequently, the shaft and impeller cannot be formed as one unit, and the impeller must somehow be joined securely and non-turnably to the shaft. One known connection is disclosed in U.S. Pat. No. 4,155,333 to Maggiorana, which shows matching non circular surfaces on the shaft and impeller to prevent relative turning, and a nut and washer connection to secure the impeller to the shaft. A more complex connection between plastic impeller and steel shaft is disclosed in U.S. Pat. No. 4,363,603 to Peterson. A threaded plug on the end of the shaft is screwed into a threaded metal insert molded into the center of the impeller. A sleeve of the impeller with a cutout on the edge slip fits over a knurled outer surface formed on the shaft. A knurled segment that interfits with the knurled shaft surface also fits closely into the impeller sleeve cutout to lock the impeller to the shaft and prevent relative turning. A separate collar is used to hold the locking segment into the cutout and onto the shaft. Clearly, this represents a quite complex and potentially expensive connection, since it requires the molding of the insert into the impeller, as well as the separate locking segment and collar.

SUMMARY OF THE INVENTION

The invention provides an integral connection between a steel shaft and plastic impeller that may be simply and inexpensively formed, and which requires no separate fasteners of any kind. The plastic impeller is injection molded with a central male plug of non circular, octagonal cross section. A cylindrical wall concentrically surrounds the male plug, radially spaced therefrom. The impeller cylindrical wall is sufficiently thin so as to be partially flexible in the radial direction. The entire surface of the impeller is formed with no undercuts, except for a circular rib that is molded onto the radially inwardly facing surface of the impeller cylindrical wall. The wall is sufficiently flexible that the plug, wall and rib can be molded together with one axially slidable die element which snaps past the rib without damage as it is withdrawn. The entire impeller may, therefore, be molded with only three axially movable dies.

The end of the impeller drive shaft has a female socket machined into it with an octagonal surface that interfits closely with the impeller plug. A cylindrical wall of the shaft concentrically surrounds the socket, with a circular groove machined into its radially outwardly facing surface that matches the impeller rib. The impeller wall is sufficiently flexible that when the shaft socket is pushed forcibly over the impeller plug, the impeller wall will be flexed radially outwardly as the rib simultaneously snaps into the groove. The impeller is thus non-turnably connected to the shaft with no separate fasteners. The impeller wall is not so flexible that the axial forces to which the impeller is subjected in operation can pull the rib out of the groove, so the connection is also secure. Since the cylindrical walls concentrically surround the plugs and sockets, the connection is also axially compact.

It is, therefore, a general object of the invention to provide an integral connection between a metal water pump drive shaft and a molded plastic impeller, a connection that requires no separate fasteners.

It is another object of the invention to provide such a connection that includes a matching non circular cross section plug and socket to provide a non turnable connection, and a matching circular rib and groove to provide a secure connection, with either the groove or the rib being formed on an integrally molded cylindrical wall of the impeller that is sufficiently radially flexible to allow the impeller to be snapped onto the shaft, but not sufficiently flexible to allow it to be pulled off in service, so as to give a secure connection.

It is yet another object of the invention to provide such an integral connection in which the various plugs, sockets and walls are concentrically formed, so as to give an axially compact connection.

It is still another object of the invention to provide such a connection in which the impeller may be simply and inexpensively integrally injection molded with only three dies.

DESCRIPTION OF THE PREFERRED EMBODIMENT

These and other objects and features of the invention will appear from the following written description, and from the drawings, in which.

Figure 1:
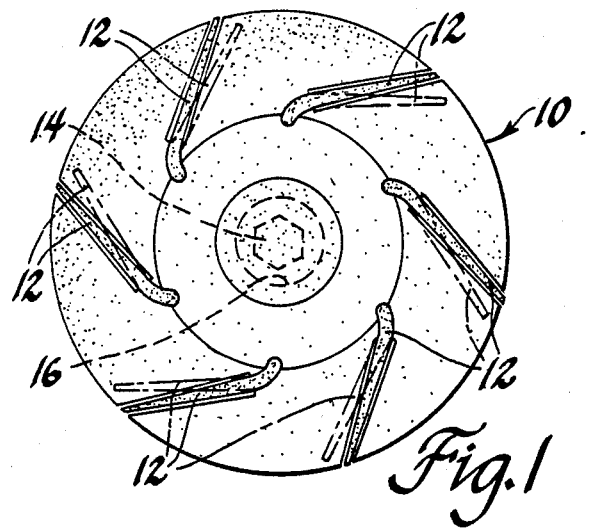
FIG. 1 is an end view of the front of the impeller.
Figure 2:
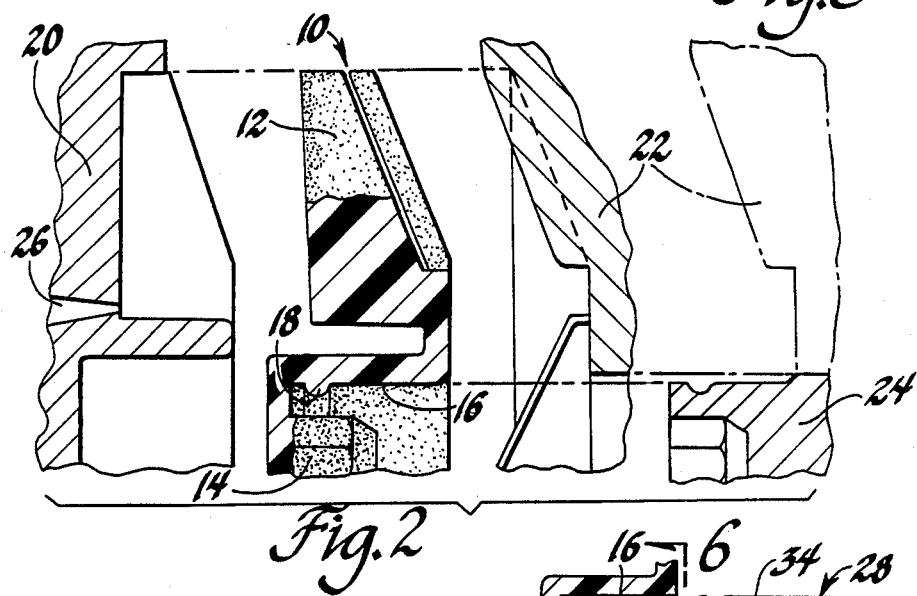
FIG. 2 is a top half cross sectional view of the impeller and the dies used to mold it.
Figure 6:
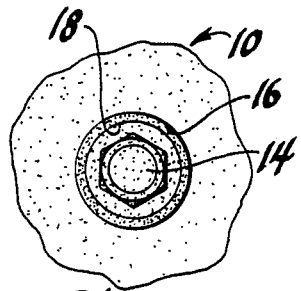
FIG. 6 is a view taken along the line 6—6 of FIG. 4.

Referring first to FIGS. 1, 2 and 6, an impeller, designated generally at 10, is formed as one piece injection molding of a suitable plastic material. In the particular embodiment disclosed, the outer portion of impeller 10 is molded with six radially outwardly directed vanes 12 that are flexible, as shown in dotted lines, so as to change angle at higher speeds. The vane flexibility would reduce the horsepower consumption of the water pump, not illustrated, in which impeller 10 would be used. The center portion of impeller 10 includes a male plug 14 of octagonal cross section, the axis of which is on the center line of the impeller 10. Plug 14 is surrounded concentrically by a radially spaced cylindrical wall 16 that is somewhat longer than plug 14. Wall 16 is also radially spaced from the rest of impeller 10, and its radial thickness is sufficiently small that it is partially radially flexible, both in and out. The radially inwardly facing surface of impeller wall 16 is also molded with an inwardly extending circular rib 18. As can be best seen in FIG. 2, all of the external surfaces of impeller 10, except for the rib 18, have no undercuts relative to the center line axis. Therefore, but for the rib 18, the entire impeller 10 could be by pass molded, that is, molded with only two dies that parted straight along the center line, without any slides or mold inserts. Instead, one die elements 20 and 22, is used to form the entire left side and another, 24, is used to form the radially outer portion of the right side. A slidable center die 24 is used to form the plug 14, the inner surface of cylindrical wall 6, and rib 18. Sequentially, the die elements 20, 22 and 24 are initially closed, and plastic material is injected through gates 26. After solidification of the plastic, the left die 20 is pulled straight to the left, and then the center die 24 is pulled straight to the right. As die 24 is pulled, rib 18 is pushed radially outwardly. Cylindrical wall 16 flexes radially outwardly freely enough to allow rib 18 to pop free without damage. Then, impeller 10 is free to be lifted off of right die 22.

Figure 3:
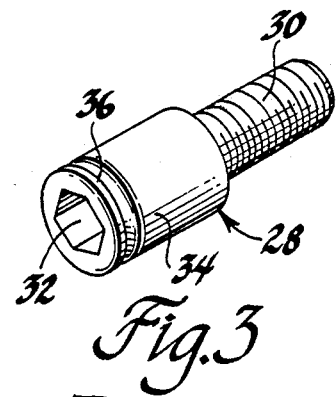
FIG. 3 is a perspective view of the impeller drive shaft.
Figure 4:
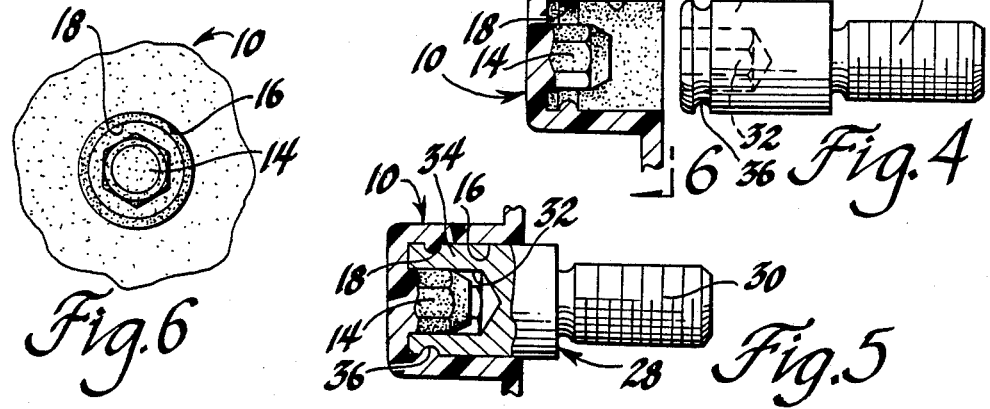
FIG. 4 is a side view of the drive shaft and the center portion of the impeller, shown partially in cross section, before connection of the impeller to the shaft.
Figure 5:
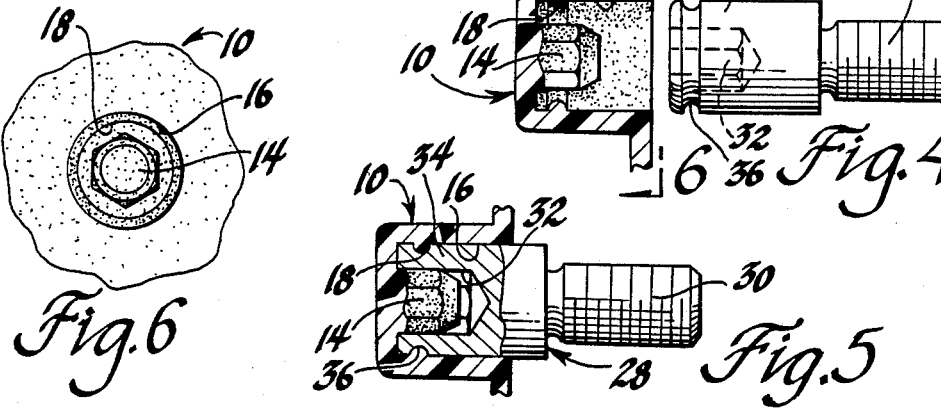
FIG. 5 is a view like FIG. 4, but after connection.

Referring next to FIGS. 3, 4 and 5, a generally cylindrical steel impeller drive shaft, designated generally at 28, has a threaded portion 30 at one end for connection to a power source, not shown. The other end of shaft 28 is configured so as to be connected to impeller 10 with a simple push fit, with no separate fasteners. Specifically, a female socket 2 with a cross sectional shape matching male plug 14 is machined into the center of the left end of shaft 30. Socket 32 is slightly longer than plug 14, but the fit therebetween is close. A cylindrical wall 34 concentrically surrounds socket 32, with an OD that matches the ID of impeller wall 16. Machined into wall 34 is a circular groove 36 that matches circular rib 18. In general, the outer surface of the left end of shaft 28 matches the configuration of the die 24. As may be seen by comparing FIGS. 4 and 5, impeller 10 may be connected to shaft 28 with a simple push fit. Shaft wall 34 slides within impeller wall 16 as plug 14 slides simultaneously within socket 32. The interfit of plug 14 and socket 32 prevents relative turning between impeller 10 and shaft 28. The assembler would have to rotate impeller 10 until the two octagonal shapes of socket 32 and plug 14 matched, but this can be easily done by feel. Finally, rib 18 would pop into groove 36, which would flex impeller wall 16 temporarily outwardly. Although the pushing force that must be applied to flex wall 16 out is relatively high, it is a one time operation, and rib 18 is not damaged. The same force would have to be applied to pull impeller 10 off of shaft 28, and that level of axial force will not generally be seen by the impeller 10 in operation. Therefore, the connection is highly secure, with no separate fasteners to either be added at assembly, or to loosen during operation. While the connection is not intended to be reversible, it is not contemplated that the corrosion proof impeller 10 would ever have to be removed, unless it was somehow irreparably damaged during installation, in which case it could just be cut off and a new one added.

Variations of the preferred embodiment could be made. The matching plug and socket could be formed on either the shaft or the impeller, and could have any matching cross section that was non circular, so as to prevent relative turning. The matching rib and groove could be formed on either the impeller's cylindrical wall or on the shaft's cylindrical wall, and need not comprise a full 360 degrees each, although that clearly gives a more secure connection. The matching surfaces of the shaft's cylindrical wall and the impeller's cylindrical wall could face in either radial direction, so long as they faced in opposite radial directions. The flexible cylindrical wall, however, has to be formed on the plastic impeller. The cylindrical walls need not concentrically surround the plug and socket, but could instead be in line therewith, so long as they were coaxial to the plug and socket. The concentric, surrounding configuration is axially compact, however, since the plug, socket and walls occupy overlapping axial space.

The embodiments of the invention in which an exclusive property or privilege is claimed are defined as follows:

1. An axially compact and integral connection between a plastic impeller and a coaxial metal impeller drive shaft, comprising,
    a male plug formed on said impeller having a surface with a non-circular cross section,
    a female socket formed on said drive shaft having a surface of non circular cross section that interfits closely with said male plug,
    a substantially rigid cylindrical wall on said drive shaft generally concentric with and surrounding said socket and facing in one radial direction,
    a cylindrical wall on said impeller that is generally concentric with and surrounds said plug with a diameter substantially equal to said drive shaft cylindrical wall and facing in the other radial direction, so that said drive shaft and impeller walls are also closely interfittable, said impeller cylindrical wall further being molded with a sufficiently small radial thickness so as to be partially flexible in the radial direction,
    a circular rib formed on one of said drive shaft and impeller cylindrical walls, and,
    a circular groove formed on the other of said drive shaft and impeller cylindrical walls and sized so as to fit closely within said circular rib,
    whereby, said impeller may be connected to said drive shaft by forcibly pushing said impeller onto said drive shaft, with said plug and socket interfitting so as to prevent turning between said impeller and drive shaft, and with said circular rib entering said circular groove as said impeller wall is simultaneously radially flexed, thereby axially locking said impeller to said drive shaft, said generally concentric plug, socket and cylindrical walls also occupying overlapping axial space so as give an axially compact connection.

* * * * *